United States Patent
Bouhnik et al.

(10) Patent No.: US 11,156,731 B2
(45) Date of Patent: Oct. 26, 2021

(54) SYSTEMS AND METHODS FOR IMPROVED DETECTOR ASSEMBLY SIZING

(71) Applicant: General Electric Company, Schenectady, NY (US)

(72) Inventors: Jean-Paul Bouhnik, Zichron Yaacov (IL); Moshe Levy, Haifa (IL); Omri Warshavski, Tirat Carmel (IL)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/004,783

(22) Filed: Aug. 27, 2020

(65) Prior Publication Data

US 2020/0393577 A1 Dec. 17, 2020

Related U.S. Application Data

(63) Continuation of application No. 16/001,683, filed on Jun. 6, 2018, now Pat. No. 10,761,224.

(51) Int. Cl.
*G01T 1/24* (2006.01)
*G01T 1/161* (2006.01)

(52) U.S. Cl.
CPC ............ *G01T 1/247* (2013.01); *G01T 1/161* (2013.01); *G01T 1/241* (2013.01); *G01T 1/244* (2013.01)

(58) Field of Classification Search
CPC .......... G01T 1/24; G01T 1/247; G01T 1/161; G01T 1/241
See application file for complete search history.

(56) References Cited

U.S. PATENT DOCUMENTS

| | | | | |
|---|---|---|---|---|
| 3,543,384 A | * | 12/1970 | Hansen | G01T 1/1645 82/47 |
| 6,388,244 B1 | * | 5/2002 | Gagnon | G01T 1/1615 250/208.1 |
| 6,748,044 B2 | * | 6/2004 | Sabol | G06T 7/0012 250/363.04 |
| 7,381,959 B2 | * | 6/2008 | Manjeshwar | G01T 1/2985 250/363.03 |
| 9,983,320 B1 | * | 5/2018 | Shahar | G01T 1/242 |
| 2010/0148082 A1 | * | 6/2010 | Du | H01L 27/14636 250/370.09 |
| 2012/0108948 A1 | * | 5/2012 | Jansen | A61B 6/4258 600/411 |
| 2012/0205542 A1 | * | 8/2012 | Goedicke | A61B 6/027 250/363.05 |

* cited by examiner

*Primary Examiner* — David P Porta
*Assistant Examiner* — Fani Boosalis

(57) ABSTRACT

A detector assembly is provided that includes a semiconductor detector, a collimator, and a processing unit. The semiconductor detector has a first surface and a second surface opposed to each other. The first surface includes pixelated anodes, and the second surface includes a cathode electrode. The collimator includes openings defined by septa. The collimator defines a pitch D between adjacent septa, with the septa defining a septa length L. A ratio of L/D is less than 14. The processing unit is configured to identify detected events within virtual sub-pixels distributed along a length and width of the semiconductor detector. Each pixel comprises a plurality of corresponding virtual sub-pixels, and absorbed photons are counted as events in a corresponding virtual sub-pixel.

20 Claims, 9 Drawing Sheets

SYSTEMS AND METHODS FOR IMPROVED DETECTOR ASSEMBLY SIZING

This application is a continuation application of, and claims benefit to the filing date of, U.S. patent application Ser. No. 16/001,683, filed 6 Jun. 2018, entitled "Systems and Methods for Improved Detector Assembly Sizing," the entire disclosure of which is incorporated by reference herein.

BACKGROUND OF THE INVENTION

The subject matter disclosed herein relates generally to apparatus and methods for diagnostic medical imaging, such as Nuclear Medicine (NM) imaging.

In NM imaging, systems with multiple detectors or detector heads may be used to image a subject, such as to scan a region of interest. For example, the detectors may be positioned adjacent the subject to acquire NM data, which is used to generate a three-dimensional (3D) image of the subject. System performance may be limited or affected by the size of detector units, which may impact how closely detectors may be placed to an object to be imaged, for example.

BRIEF DESCRIPTION OF THE INVENTION

In one embodiment, a detector assembly is provided that includes a semiconductor detector, a collimator, and a processing unit. The semiconductor detector has a first surface and a second surface opposed to each other. The first surface includes pixelated anodes, and the second surface includes a cathode electrode. The collimator includes openings defined by septa. The collimator defines a pitch D between adjacent septa, with the septa defining a septa length L. A ratio of L/D is less than 14. The processing unit is configured to identify detected events within virtual sub-pixels distributed along a length and width of the semiconductor detector. Each pixel comprises a plurality of corresponding virtual sub-pixels, and absorbed photons are counted as events in a corresponding virtual sub-pixel.

In another embodiment, a detector assembly is provided that includes a semiconductor detector, a collimator and a processing unit. The semiconductor detector has a first surface and a second surface opposed to each other. The first surface includes pixelated anodes, and the second surface includes a cathode electrode. The collimator includes openings defined by septa. The collimator defines a pitch D between adjacent septa, and the septa define a septa length L. The processing unit is configured to identify detected events within virtual sub-pixels distributed along a length and width of the semiconductor detector, wherein each pixel comprises a plurality of corresponding virtual sub-pixels, wherein absorbed photons are counted as events in a corresponding virtual sub-pixel. The virtual sub-pixels define a sub-pixel pitch d, wherein a ratio of L/d is 25 or more.

In another embodiment, a method (e.g., a method of providing a detector assembly) includes providing a semiconductor detector having a first surface and a second surface opposed to each other, with the first surface including pixelated anodes, and the second surface including a cathode electrode. Further, the method includes disposing a collimator proximate the semiconductor detector. The collimator includes openings defined by septa. The collimator defines a pitch D between adjacent septa, with the septa defining a septa length L. A ratio of L/D is less than 14. The method also includes coupling a processing unit to the semiconductor detector. The processing unit is configured to identify detected events within virtual sub-pixels distributed along a length and width of the semiconductor detector, wherein each pixel comprises a plurality of corresponding virtual sub-pixels, wherein absorbed photons are counted as events in a corresponding virtual sub-pixel.

DETAILED DESCRIPTION OF THE INVENTION

Figure 1:
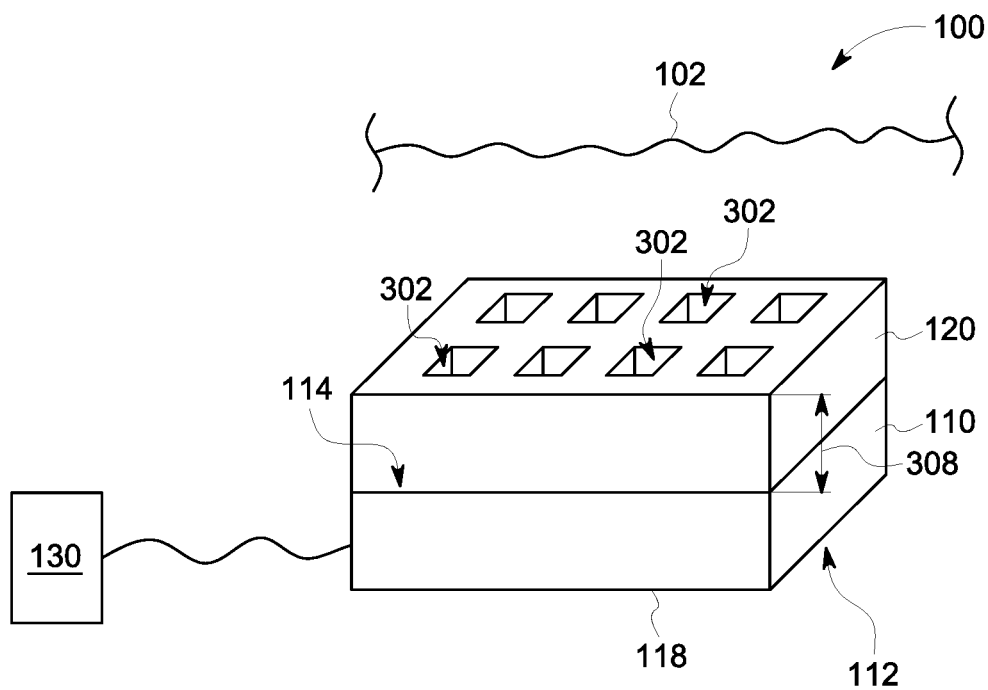
FIG. 1 provides a schematic block view of a detector assembly in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. For example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. Various modules or units shown in the attached figures may represent the hardware that operates based on software or hardwired instructions, the software that directs hardware to perform the operations, or a combination thereof.

"Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

As used herein, an element or step recited in the singular and preceded with the word "a" or "an" should be understood as not excluding plural of said elements or steps, unless such exclusion is explicitly stated. Furthermore, references to "one embodiment" of are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Various embodiments provide systems and methods for improving image quality. For example, various embodiments may improve one or more of sensitivity, resolution, contrast, and distance to object being imaged. Various embodiments utilize virtual sub-pixel based sensing, for example, to reduce energy tails.

It may be noted that sensitivity and contrast may be improved by reducing an energy tail (e.g., energy tail for a CZT detector), or transferring events from the tail into the energy window used to count events. One way to accomplish such a transfer is to reduce the size of pixels or contacts. Another way is to increase the thickness of the CZT detector. It may be noted that the thickness in practice is limited by voltage breakdown. Further, reducing pixel size may have certain drawbacks. For example, reducing pixel size prevents or inhibits the use of double pitch collimators due to manufacturing complexity of the required septa sizes, and impacts sensitivity. Use of a single pitch collimator may in turn tend to make collimator septa higher, increasing the column diameter (or other measure of detector unit size), and negatively impact resolution. Various embodiments address these issues by using sub-pixel sensing in conjunction with reduced collimator septa height, reducing detector unit size and improving detector distance to patient.

A technical effect provided by various embodiments includes improved image quality, for example by increasing one or more of sensitivity, resolution, or contrast of a detector system, such as a NM imaging detector system. A technical effect provided by various embodiments includes reduced detector unit size, allowing for closer placement to an object being imaged.

Figure 2:
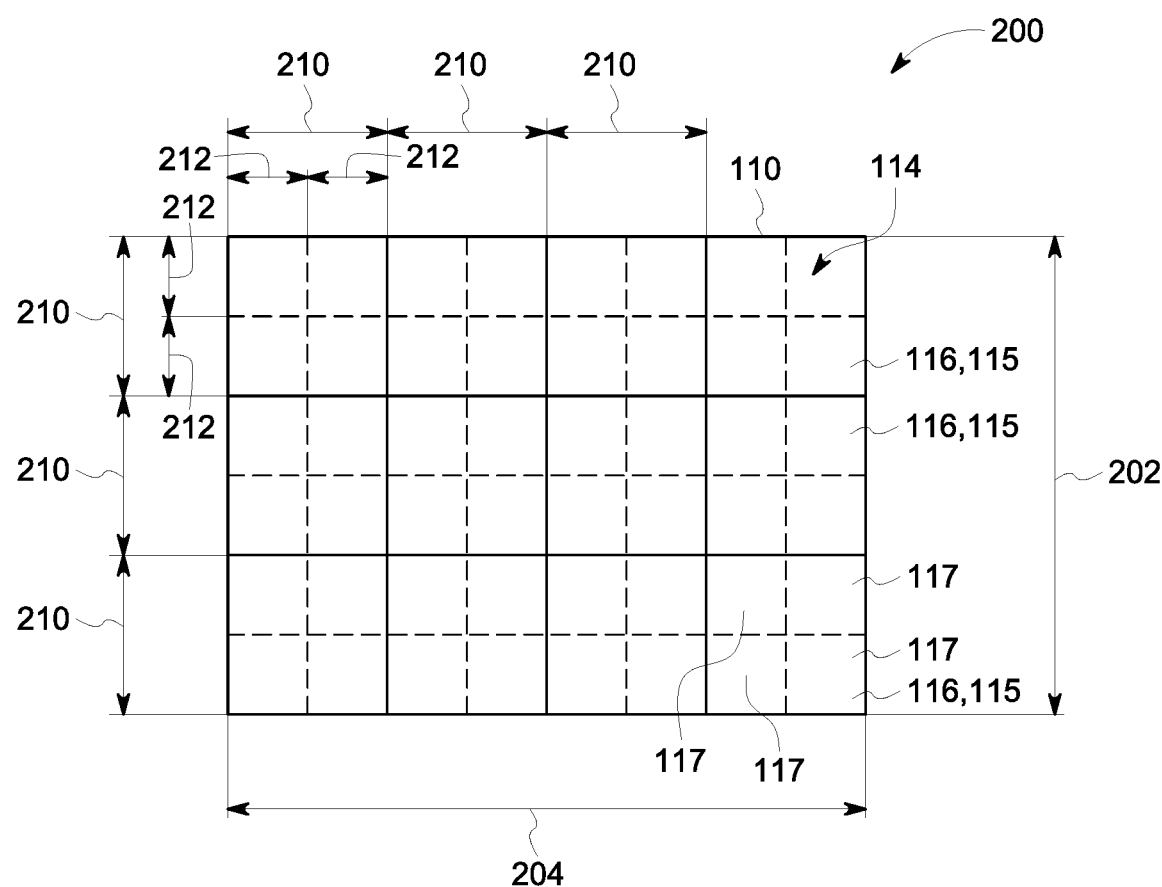
FIG. 2 provides assembly schematic plan view of a semiconductor detector of the detector assembly of FIG. 1.

FIG. 1 provides a schematic block view of a detector assembly 100 in accordance with various embodiments, and FIG. 2 illustrates a plan view of the second surface 114 of the semiconductor detector 110. As seen in FIG. 1, the detector assembly includes a semiconductor detector 110, a collimator 120, and a processing unit 130. Generally, the semiconductor detector 110 produces signals in response to absorption events (e.g., photons produced in response to a radiopharmaceutical that has been administered to an object being imaged that impact the semiconductor detector 110). The signals are provided to the processing unit 130, which uses identified events to reconstruct an image of the object being imaged and to derive the location of the event inside the physical pixel as described, for example in U.S. patent application Ser. No. 15/280,640. The collimator 120 guides photons to the semiconductor detector 110, and limits the angular range of approach of photons to a given pixel or portion of the semiconductor detector 110, helping to allow for accurate determination of the portion of the object being imaged from which a given detected event originated.

As depicted in FIGS. 1 and 2, the semiconductor detector 110 has a first surface 112 and a second surface 114. The second surface 114 is opposed to the first surface 112 (and, likewise, the first surface 112 is opposed to the second surface 114). The semiconductor detector 110 is configured to generate electrical signals in response to photon impacts. The semiconductor detector 110, for example, may be made of Cadmium Zinc Telluride (CZT). The second surface 114 includes pixelated anodes 116 disposed thereon, and the first surface 112 includes a cathode electrode 118 disposed thereon. It may be noted that, in some embodiments, the cathode electrode 118 may be a monolithic, or single, cathode, while in other embodiments multiple cathode electrodes may be employed. The cathode electrode 118 collects an opposite electrical charge of the pixelated anodes 116, and the pixelated anodes 116 are used to generate signals in response to charges generated by the semiconductor detector 110 responsive to photon impacts.

In various embodiments, the pixelated anodes 116 are arranged in a grid, with the location of one or more pixelated anodes 116 at which a signal is generated responsive to a photon impact used to determine a corresponding location in the object corresponding to the photon impact. Each pixelated anode 116 may also be understood as corresponding to a pixel 115 of the semiconductor detector 110 or a pixel represented in an imaging dataset acquired via the semiconductor detector 110. As seen in FIG. 2, the pixelated anodes 116 are arranged in a grid 200 having a length 202 and a width 204. In the illustrated embodiment, the pixelated anodes 116 are square shaped, and have a uniform pixel pitch 210 along both the length 202 and width 204, or uniform spacing between adjacent pixels. It may be noted that other arrangements (e.g., different pitches along the length and width, varying pitch along the length and/or width, different pixel shapes) may be utilized in various embodiments.

As seen in FIG. 1, the collimator 120 is interposed between the semiconductor detector 110 and an object 102 being imaged. The collimator 120 is used to control passage of radiation from the object 102 being imaged to the semiconductor detector 110. The collimator 120 includes openings that are configured to guide photons to the semiconductor detector 110, limiting an angular range of approach for photons that impact the semiconductor detector 110.

Figure 3:
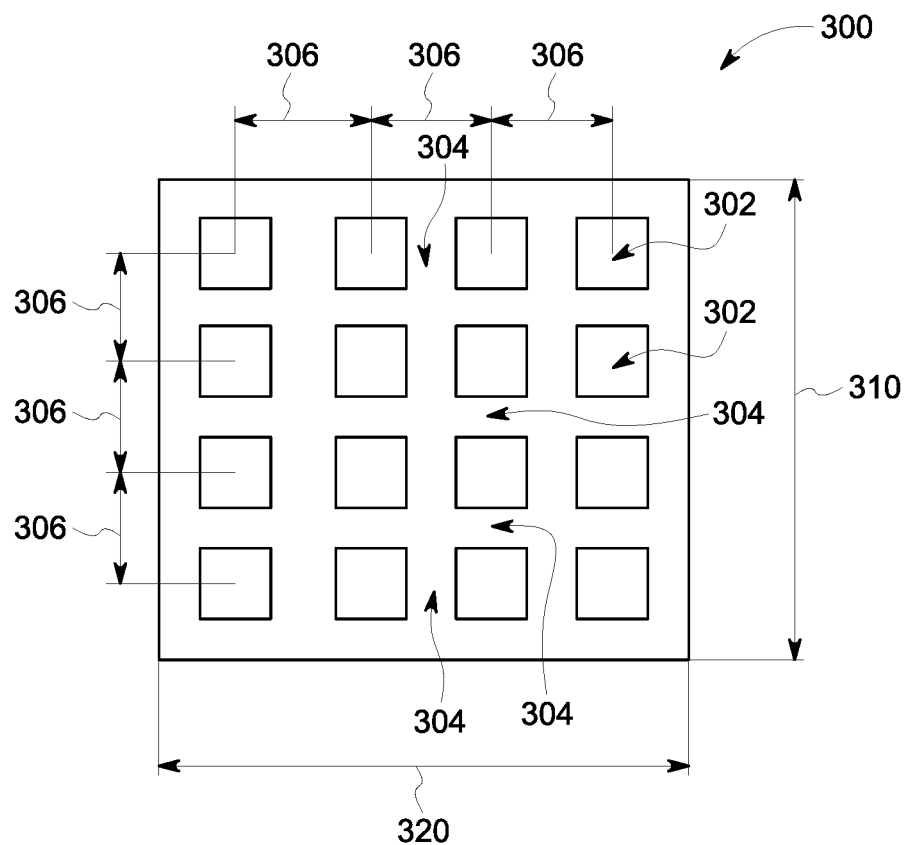
FIG. 3 provides a schematic plan view of a collimator of the detector assembly of FIG. 1.
Figure 4:
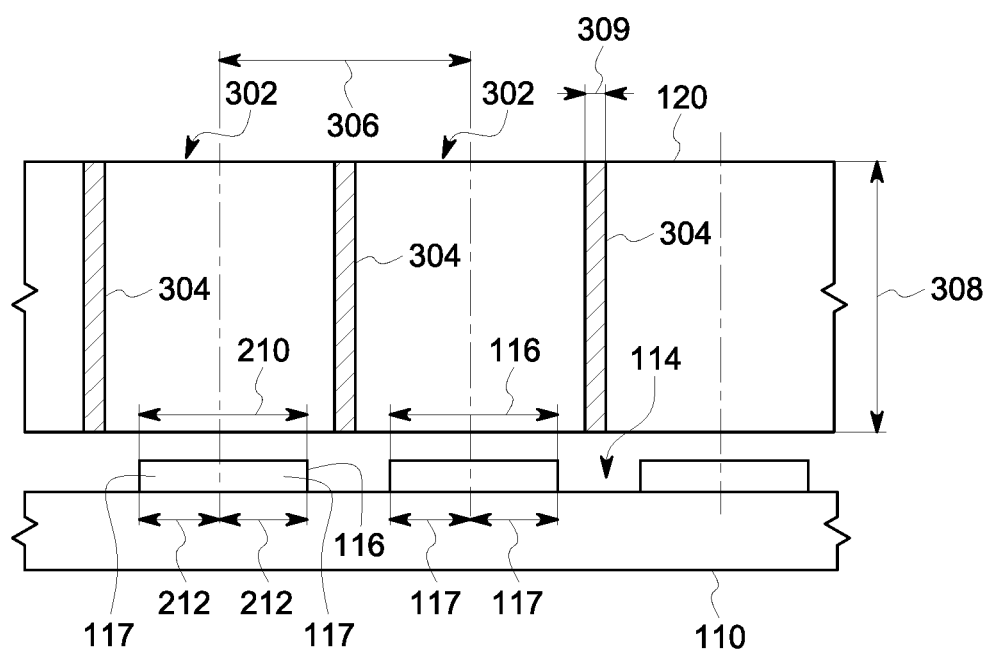
FIG. 4 illustrates an exploded sectional side view of a detector assembly in accordance with various embodiments.

FIG. 3 illustrates a plan view of the collimator 120. As seen in FIG. 3, the depicted example includes an array 300 of openings 302 that are defined between septa 304. The array 300 extends along a length 310 and a width 320 of the collimator 120, with the openings 302 of the depicted embodiment spaced at uniform pitch 306 along both the length 310 and width 320 in the illustrated example. It may be noted that, in other embodiments, the pitch along the length 310 may differ from the pitch along the width 320, and/or the pitch may vary along the length 310 and/or the width 320. In the illustrated embodiment, each opening 302 of the collimator 120 is associated with a single corresponding pixelated anode 116 (or corresponding pixel) of the semiconductor detector 110. (It may be noted that in other embodiments, as discussed herein, collimator openings may be shifted relative to pixels.) Accordingly, the array 300 of openings 302 of the collimator 120 may be understood as having a 1:1 correspondence with the grid 200 of pixelated anodes 116 (or corresponding pixels) of the semiconductor detector 110. The array 300 of openings 302 in the illustrated embodiment corresponds to the grid 200 of pixelated anodes 116, with radiation passing through a given opening 302 guided to the corresponding pixelated anode 116. As such, radiation that passes through a given opening 302 is confined within a single cell of the collimator 120, and is absorbed at a location corresponding to one and only one pixelated anode 116 that is associated with the given opening 302 (e.g., located directly beneath the opening 302). FIG. 4 illustrates an exploded cross-section of the collimator 120 and semiconductor detector 110 showing the septa length 308, collimator pitch 306, and sub-pixel pitch 212 (see also FIG. 2). As seen in FIGS. 1 and 4, the septa 304 define a septa length 308 and septa thickness 309. Both the septa length 308 and the pitch 306 are shown as uniform in FIGS. 1 and 3; however, it may be noted that either parameter value may vary in various embodiments. Further, it may be noted that the depicted septa 304 are parallel to each other, normal to the second surface 114, and define square-shaped cross sections for each collimator cell; however, it may be noted that different configurations may be employed in alternate embodiments. It may also be noted that, for the example depicted in FIG. 3, the collimator may be understood as a registered collimator, or a collimator having a collimator septa over each boundary between adjacent physical pixels. (It may also be noted that a dual-pitch collimator may also be registered).

Figure 9:
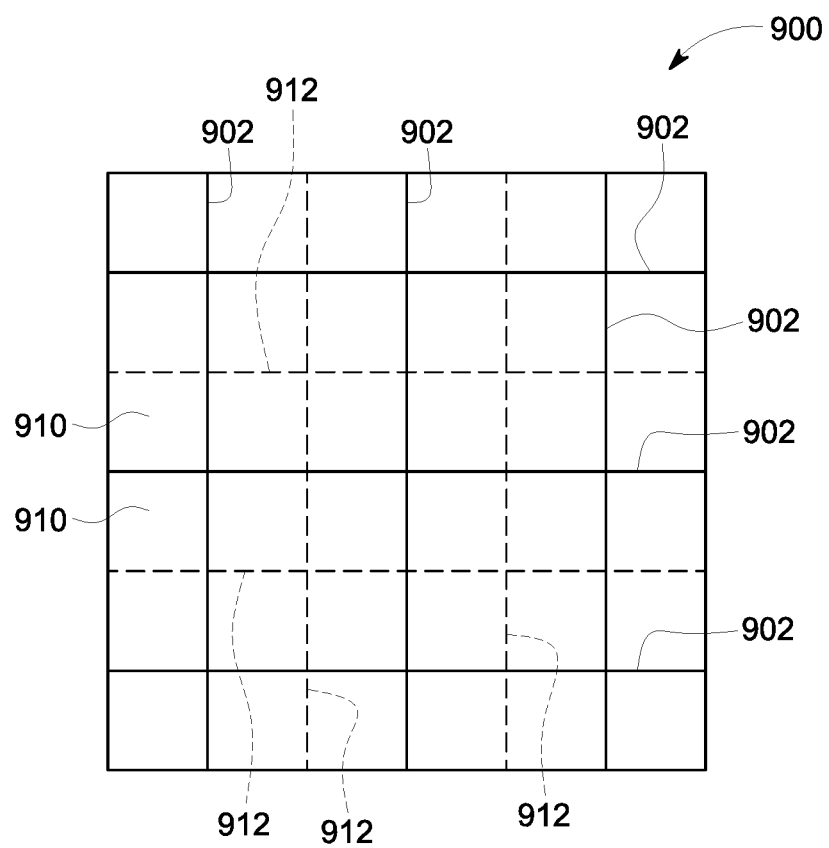
FIG. 9 illustrates a schematic plan view of a collimator with septa that are not aligned with boundaries of corresponding pixelated anodes in accordance with various embodiments.

In some embodiments, however, the collimator may not be registered. For example, in some embodiment, the septa of a collimator may be shifted relative to pixelated anodes, with the septa not aligned with boundaries between the pixelated anodes. FIG. 9 illustrates a collimator 900 with septa 902 (shown in solid lines) that are not aligned with boundaries 912 (shown in dashed lines) of corresponding pixelated anodes 910. In the embodiment depicted in FIG. 9, the septa 902 of the collimator 900 are shifted by a half pixel in both x and y directions with respect to the boundaries 912. Accordingly, the septa 902 pass along centerlines of the pixelated andoes 912, and the septa 902 cross the pixel area at the center of the pixel, which is the pixel area with the lowest subpixel accuracy because it is the portion of the pixel farthest away from neighboring pixels. Accordingly, by shifting the collimator position with respect to pixelated anodes, the portions of the pixels with the lowest subpixel accuracy may be aligned with the septa 902.

The processing unit 130 is operably coupled to the semiconductor detector 110, and is configured to identify detected events. The depicted processing unit is configured to derive the location of events within physical pixelated anodes 116 and, based on their location, assign them to virtual sub-pixels 117 distributed along the length 202 and width 204 of the semiconductor detector 110 to be counted at the assigned location. As seen in FIG. 2, the virtual sub-pixels 117 are represented by dashed lines passing through the semiconductor detector 110 corresponding to the location of the virtual sub-pixels 117. The virtual sub-pixels 117 in the illustrated example are spaced at a sub-pixel pitch 212, which is half the pixel pitch 210. It may be noted that in the illustrated examples, the semiconductor detector 110 includes 2 virtual sub-pixels 117 across a width of each pixelated anode 116 (or corresponding pixel), and 2 virtual sub-pixels 117 across a length of each pixelated anode 116. Each pixelated anode 116 or corresponding pixel includes a plurality of corresponding virtual sub-pixels, with absorbed photons in the semiconductor detector 110 counted as events in a corresponding virtual sub-pixel. Additional discussion regarding virtual sub-pixels and the use of virtual sub-pixels, and the use of collected and non-collected charge signals may be found in U.S. patent application Ser. No. 14/724,022, entitled "Systems and Method for Charge-Sharing Identification and Correction Using a Single Pixel," filed 28 May 2015 ("the 022 Application); U.S. patent application Ser. No. 15/280,640, entitled "Systems and Methods for Sub-Pixel Location Determination," filed 29 Sep. 2016 ("the 640 Application"); and U.S. patent application Ser. No. 14/627,436, entitled "Systems and Methods for Improving Energy Resolution by Sub-Pixel Energy Calibration," filed 20 Feb. 2015 ("the 436 Application). The subject matter of each of the 022 Application, the 640 Application, and the 436 Application are incorporated by reference in its entirety.

In various embodiments the processing unit 130 includes processing circuitry configured to perform one or more tasks, functions, or steps discussed herein. It may be noted that "processing unit" as used herein is not intended to necessarily be limited to a single processor or computer. For example, the processing unit 130 may include multiple processors, ASIC's, FPGA's, and/or computers, which may be integrated in a common housing or unit, or which may distributed among various units or housings. It may be noted that operations performed by the processing unit 130 (e.g., operations corresponding to process flows or methods discussed herein, or aspects thereof) may be sufficiently complex that the operations may not be performed by a human being within a reasonable time period. For example, the determination of values of collected, non-collected, and/or combined charge signals within the time constraints associated with such signals may rely on or utilize computations that may not be completed by a person within a reasonable time period.

As discussed, herein, signals are generated by one or more pixelated anodes 116 in response to a photon impact, with the location of the pixelated anode(s) 116 generating a signal used to determine a corresponding location in the object for which an event is counted. In various embodiments, as also discussed in the 022 Application, the 640 Application, and the 436 Application, signals from adjacent pixels may be used to assign a virtual sub-pixel location within a given pixelated anode 116. In some embodiments, the processing unit 130 is configured to determine an absorption location for a given absorbed phon based on non-collected signals received from pixelated anodes adjacent to a pixelated anode absorbing the given absorbed photon.

As discussed above, the collimator 120 has openings 302 defined between septa 304, with the openings 302 spaced at a pitch 306, and the septa having length 308. The ratio of the septa length 308 to collimator pitch 306 may be represented as L/D, where L is the septa length 308, and D is the collimator pitch 306. Various embodiments provide L/D ratios, or ranges of L/D ratios, that, combined with the use of virtual sub-pixels provide improved imaging relative to ratios of conventional detector and collimator arrangements.

For example, various embodiments utilize a ratio of L/D (or range of ratios of L/D) of less than 14, in contrast to conventional designs that may use a ratio of L/D of about 20.

In some embodiments, the ratio of L/D (or range of ratios of L/D) is between 8 or more and 12 or less. For example, in some embodiments, a septa length of 15 millimeters and collimator pitch of 1.5 millimeters may be employed. As another example, a septa length of 16 millimeters and collimator pitch of 1.42 millimeters may be employed. By utilizing such ranges of L/D ratio in conjunction with the use of virtual sub-pixels, various technical improvements or effects are achieved. For example, resolution and sensitivity may be maintained (or even increased) while decreasing collimator height. Similarly, resolution and/or sensitivity may be increased while maintaining collimator height. Use of a smaller collimator height enables use of a detector unit or head with a smaller outer dimension (e.g., radius). Such reduced detector unit size provides the ability to position a detector unit closer to the surface of an object being imaged, allowing groups of detector units to more closely approach an object being imaged before contacting adjacent detector units, and/or reduces the size and/or number of gaps between detector units.

Various embodiments additionally or alternatively utilize novel ranges of L/d, where L is the septa length 308 and d is the sub-pixel pitch 212. For purposes of comparison with designs that do not utilize virtual sub-pixels, the pitch d may be understood as being based on the smallest unit of pixel as determined by the processing unit 130. Accordingly, if virtual sub-pixels are not employed, the pitch d is the pixel pitch (e.g., pitch 210), but if virtual sub-pixels are employed, then the pitch d, then sub-pixel pitch (e.g., pitch 212). Various embodiments utilize a ratio of L/d of 25 or more, in contrast to conventional designs that may use a ratio of L/d of between about 8 and 20. For example, in some embodiments, the ratio of L/d is between 25 or more and 80 or less. By way of example, in some embodiments, a septa length of 16 millimeters may be used in connection with sub-pixel pitches of 0.5 millimeters, 0.4 millimeters, and/or 0.2 millimeters. By utilizing such ranges of L/d ratio in conjunction with the use of virtual sub-pixels (as well as L/D ratios as discussed above in various embodiments), resolution and sensitivity may be maintained while decreasing collimator height.

Figure 5:
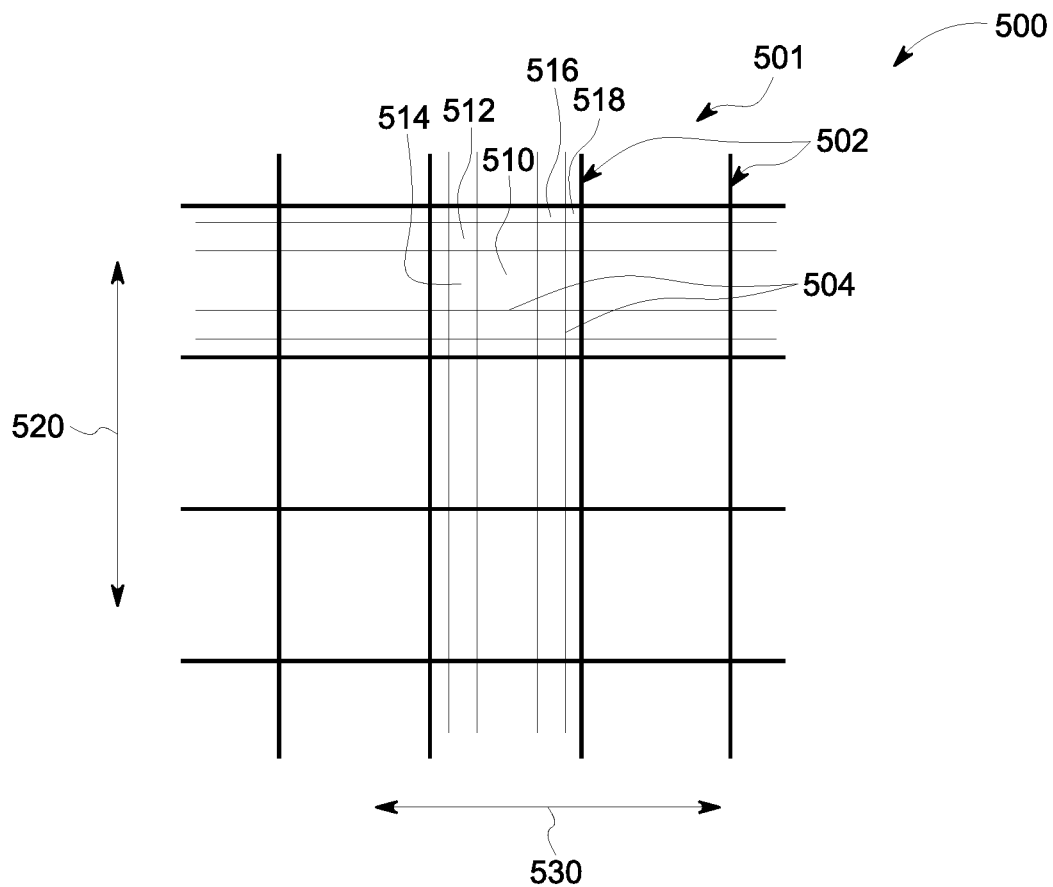
FIG. 5 illustrates a schematic plan view of a semiconductor detector in accordance with various embodiments.

It may be noted that while the collimator and sub-pixel pitches of the illustrated example are the same in both x and y directions (or along the length and width of the collimator and/or semiconductor detector), in other embodiments the collimator and/or sub-pixel pitch may be different in different directions. Alternatively or additionally, the collimator pitch and/or sub-pixel pitch may vary along a given direction (e.g., within a range of ratios as discussed herein). For example, a sub-pixel pitch may vary along at least one of a length or width of a semiconductor detector. FIG. 5 illustrates a schematic plan view of a semiconductor detector 500 having a pixel array 501 in accordance with various embodiments. It may be noted that a sub-pixel pitch defined by the pixel array 501 varies along the length 520 and the width 530 of the semiconductor detector 500. As seen in FIG. 5, the array 501 of pixels is defined by pixel boundaries 502 (shown in darker lines), and further sub-divided by virtual sub-pixel boundaries 504 (shown in lighter lines). The pitch between various virtual sub-pixels (or spacing between adjacent sub-pixel boundaries 504) of the array 501 is different, resulting in differently sized virtual sub-pixels 510, 512, 514, 516, and 518. It may be noted that the ultimate true intrinsic spatial resolution of a detector is limited by the accuracy of the determination of the location of the event as calculated by the sub-pixelization algorithm, and thus is limited by signal noise rather than the (arbitrary) selection of the sub-pixels' sizes.

Figure 6:
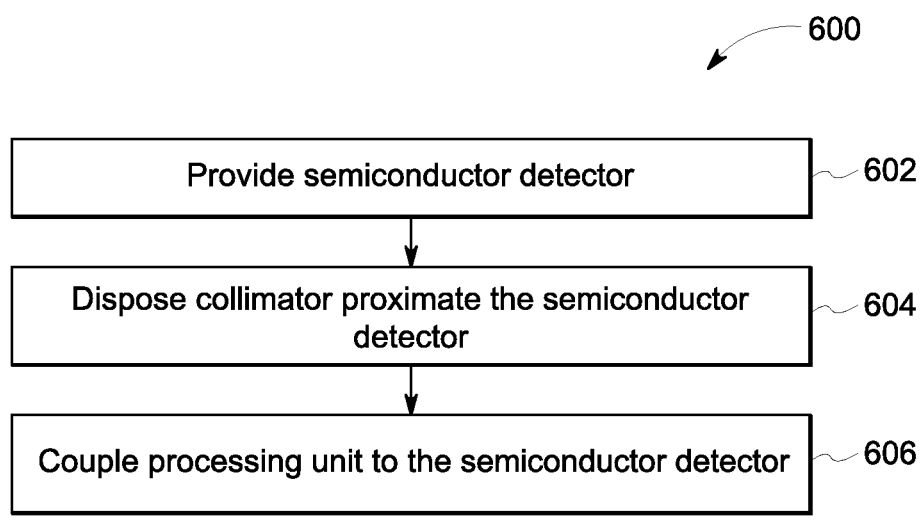
FIG. 6 provides a flowchart of a method in accordance with various embodiments.

FIG. 6 provides a flowchart of a method 600 for providing an imaging detector assembly in accordance with various embodiments. The method 600 (or aspects thereof), for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 602, a semiconductor detector (e.g., semiconductor detector 110) is provided. The semiconductor has a first surface and a second surface that are opposed to each other. The first surface includes pixelated anodes, and the second surface comprises at least one cathode electrode.

At 604, a collimator (e.g., collimator 120) is disposed proximate the semiconductor detector. For example, the collimator may be disposed proximate the first surface, with the collimator interposed between the first surface and an object to be imaged, with the collimator guiding radiation to the pixelated anodes disposed on the first surface. The collimator includes openings defined by septa, with each opening associated with a single corresponding pixel of the semiconductor detector. The collimator defines a pitch D between adjacent sept, and the septa define a septa length L. A ratio of L/D is less than 14 in various embodiments. For example, in some embodiments the ratio of L/D is less than 12. As another example, in some embodiments, the ratio of L/D is between 8 or more and 12 or less.

At 606, a processing unit (e.g., processing unit 130) is coupled to the semiconductor detector. The processing unit is configured to identify detected events within virtual sub-pixels distributed along a length oand width of the semiconductor detector. Each pixel includes a plurality of corresponding virtual sub-pixels, with absorbed photons counted as events in a corresponding virtual sub-pixel. The sub-pixels define a pitch d. In varies embodiments, the ratio of L/d is 25 or more (e.g., between 25 or more and 80 or less).

Figure 7:
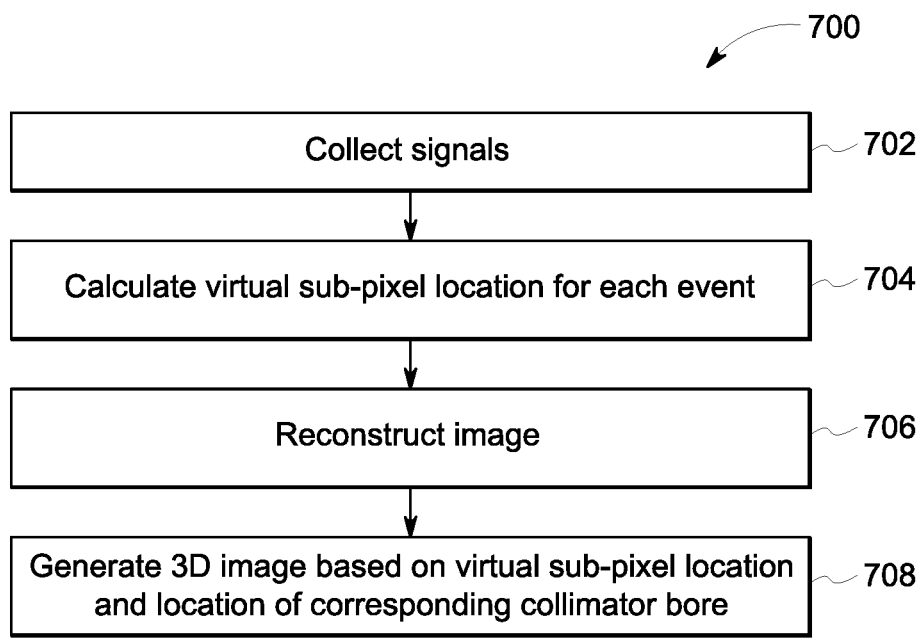
FIG. 7 provides a flowchart of a method in accordance with various various embodiments.

FIG. 7 provides a flowchart of a method 700 for providing an imaging detector assembly in accordance with various embodiments. The method 700 (or aspects thereof), for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion.

At 702, signals are collected from a plurality of adjacent pixels (e.g., of a detector). Signals are collected for each event of a plurality of events (e.g., corresponding to emission from a patient being imaged that has been administered a radiopharmaceutical). At 704, a virtual sub-pixel location is calculated for each event.

At 706, an image is reconstructed. In the illustrated embodiment, a three-dimensional (3D) image is generated at 708. In the depicted embodiment, the 3D image is generated based on, for each event, a virtual sub-pixel location (e.g., a location of the event in a grid of virtual sub-pixels), and also based on a location of a corresponding collimator bore associated with a pixel including the corresponding virtual sub-pixel (e.g., the collimator bore associated with the pixel in which the event's virtual sub-pixel resides).

Figure 8:
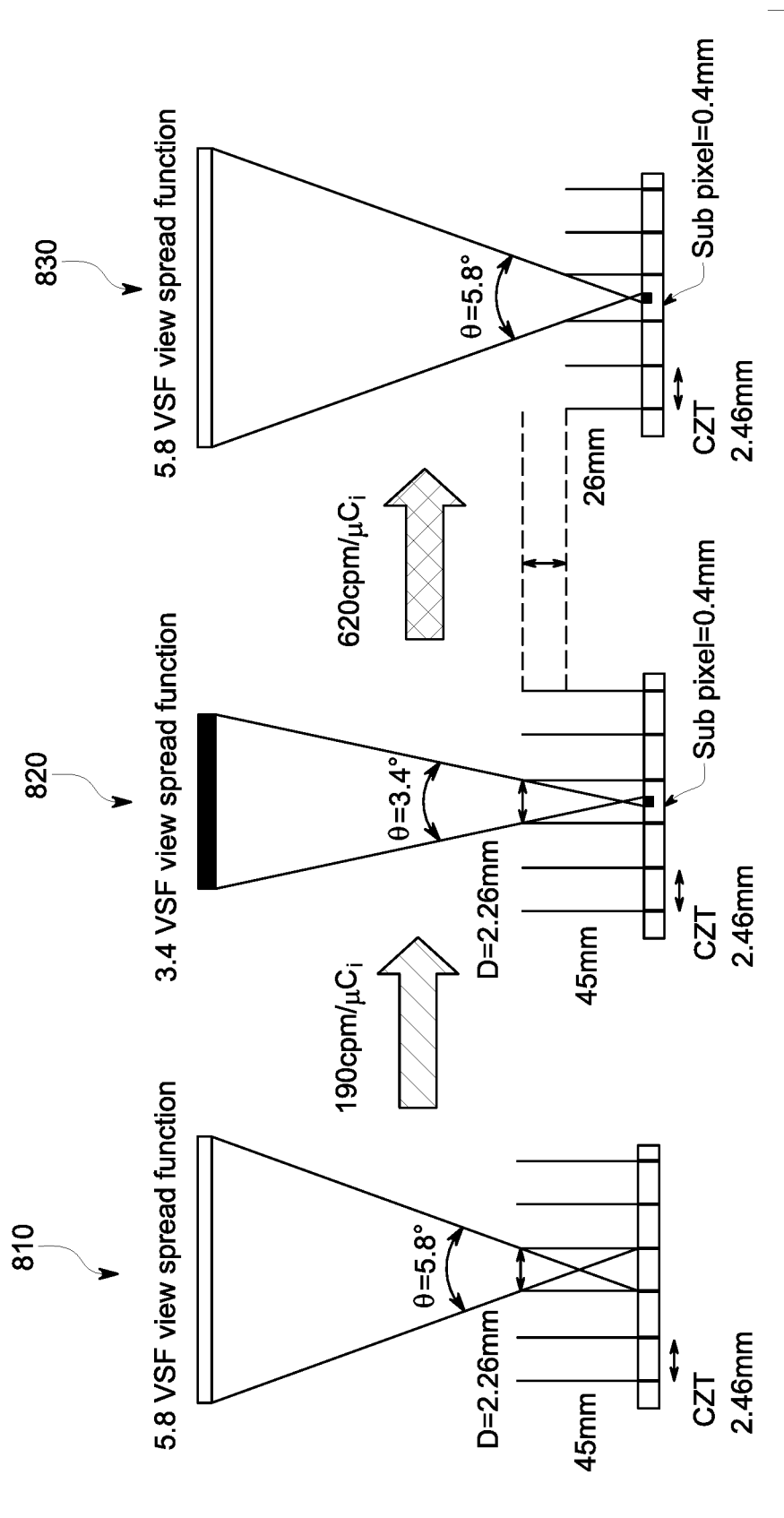
FIG. 8 illustrates various combinations of sub-pixel pitch and septa height.

It may be noted that in various embodiments the use of a reconstruction algorithm utilizing sub-pixels allows the advantages provided by the various structures discussed herein to be beneficially realized. For example, FIG. 8 shows a comparison of sub-pixel position capability for various different arrangements. Arrangement 810 illustrates a pixelated module with a 2.46 millimeter pitch and 45 millimeter septa height. Such an arrangement provides a 5.8 degree view spread function (VSF) and a sensitivity of 190 cpm/$\mu C_i$. Arrangement 820 utilizes a similar structure as 810 (e.g., 2.46 millimeter pitch and 45 millimeter septa height). However, arrangement 820 uses a sub-pixel pitch of 0.4 millimeters, providing a 3.4 degree VSF. Accordingly, arrangement 820 provides improved resolution with a similar sensitivity with respect to arrangement 810. Arrangement 830 utilizes a 0.4 millimeter sub-pixel pitch, and also utilizes a 26 millimeter septa height, which is shorter than the septa height for arrangements 810 and 820. Arrangement 830 provides a 5.8 degree VSF, similar to arrangement 810, but provides a sensitivity of 620 cpm/$\mu C_i$. Accordingly, arrangement 830 provides a comparable resolution to arrangement 810, but provides approximately 300% more sensitivity. Arrangement 820 provides an example of improved resolution using sub-pixel based reconstruction, and arrangement 830 provides an example of improved sensitivity using sub-pixel based reconstruction. It may be noted that alternative arrangements using different sub-pixel pitches and/or different septa height than shown may be utilized that provide for both improved sensitivity and resolution relative to arrangement 810.

Figure 10:
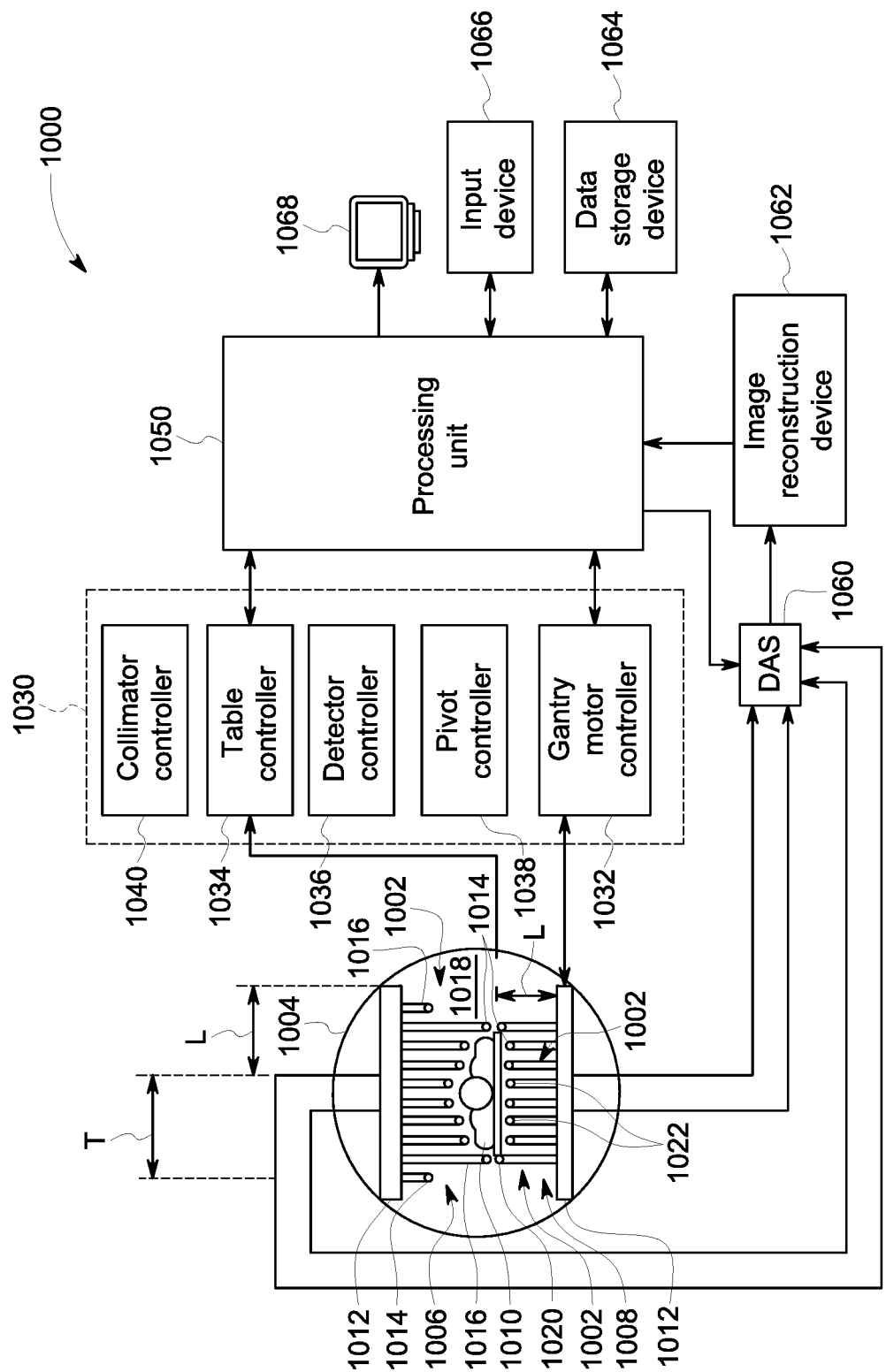
FIG. 10 is a schematic block diagram of a Nuclear Medicine (NM) imaging system in accordance with various embodiments.

FIG. 10 is a schematic illustration of a NM imaging system 1000 having a plurality of imaging detector head assemblies mounted on a gantry (which may be mounted, for example, in rows, in an iris shape, or other configurations, such as a configuration in which the movable detector carriers 1016 are aligned radially toward the patient-body 1010). In particular, a plurality of imaging detectors 1002 are mounted to a gantry 1004. Each detector 1002 may include, for example, collimators and detectors arranged generally similarly to the arrangements discussed in connection with FIGS. 1-6. In the illustrated embodiment, the imaging detectors 1002 are configured as two separate detector arrays 1006 and 1008 coupled to the gantry 1004 above and below a subject 1010 (e.g., a patient), as viewed in FIG. 10. The detector arrays 1006 and 1008 may be coupled directly to the gantry 1004, or may be coupled via support members 1012 to the gantry 1004 to allow movement of the entire arrays 1006 and/or 1008 relative to the gantry 1004 (e.g., transverse translating movement in the left or right direction as viewed by arrow T in FIG. 10). Additionally, each of the imaging detectors 1002 includes a detector unit 1014 (which may include collimator and/or detector assemblies as discussed herein), at least some of which are mounted to a movable detector carrier 1016 (e.g., a support arm or actuator that may be driven by a motor to cause movement thereof) that extends from the gantry 1004. In some embodiments, the detector carriers 1016 allow movement of the detector units 1014 towards and away from the subject 1010, such as linearly. Thus, in the illustrated embodiment the detector arrays 1006 and 1008 are mounted in parallel above and below the subject 1010 and allow linear movement of the detector units 1014 in one direction (indicated by the arrow L), illustrated as perpendicular to the support member 1012 (that are coupled generally horizontally on the gantry 1004). However, other configurations and orientations are possible as described herein. It should be noted that the movable detector carrier 1016 may be any type of support that allows movement of the detector units 1014 relative to the support member 1012 and/or gantry 1004, which in various embodiments allows the detector units 1014 to move linearly towards and away from the support member 1012.

Each of the imaging detectors 1002 in various embodiments is smaller than a conventional whole body or general purpose imaging detector. A conventional imaging detector may be large enough to image most or all of a width of a patient's body at one time and may have a diameter or a larger dimension of approximately 50 cm or more. In contrast, each of the imaging detectors 1002 may include one or more detector units 1014 coupled to a respective detector carrier 1016 and having dimensions of, for example, 4 cm to 20 cm and may be formed of Cadmium Zinc Telluride (CZT) tiles or modules. For example, each of the detector units 1014 may be 8×8 cm in size and be composed of a plurality of CZT pixelated modules (not shown). For example, each module may be 4×4 cm in size and have 16×16=256 pixels. In some embodiments, each detector unit 1014 includes a plurality of modules, such as an array of 1×7 modules. However, different configurations and array sizes are contemplated including, for example, detector units 1014 having multiple rows of modules.

It should be understood that the imaging detectors 1002 may be different sizes and/or shapes with respect to each other, such as square, rectangular, circular or other shape. An actual field of view (FOV) of each of the imaging detectors 1002 may be directly proportional to the size and shape of the respective imaging detector.

The gantry 1004 may be formed with an aperture 1018 (e.g., opening or bore) therethrough as illustrated. A patient table 1020, such as a patient bed, is configured with a support mechanism (not shown) to support and carry the subject 1010 in one or more of a plurality of viewing positions within the aperture 1018 and relative to the imaging detectors 1002. Alternatively, the gantry 1004 may comprise a plurality of gantry segments (not shown), each of which may independently move a support member 1012 or one or more of the imaging detectors 1002.

The gantry 1004 may also be configured in other shapes, such as a "C", "H" and "L", for example, and may be rotatable about the subject 1010. For example, the gantry 1004 may be formed as a closed ring or circle, or as an open arc or arch which allows the subject 1010 to be easily accessed while imaging and facilitates loading and unloading of the subject 1010, as well as reducing claustrophobia in some subjects 1010.

Additional imaging detectors (not shown) may be positioned to form rows of detector arrays or an arc or ring around the subject 1010. By positioning multiple imaging detectors 1002 at multiple positions with respect to the subject 1010, such as along an imaging axis (e.g., head to toe direction of the subject 1010) image data specific for a larger FOV may be acquired more quickly.

Each of the imaging detectors 1002 has a radiation detection face, which is directed towards the subject 1010 or a region of interest within the subject.

In various embodiments, multi-bore collimators may be constructed to be registered with pixels of the detector units 1014, which in one embodiment are CZT detectors. However, other materials may be used. Registered collimation may improve spatial resolution by forcing photons going through one bore to be collected primarily by one pixel. Additionally, registered collimation may improve sensitivity and energy response of pixelated detectors as detector area near the edges of a pixel or in-between two adjacent pixels may have reduced sensitivity or decreased energy resolution or other performance degradation. Having collimator septa directly above the edges of pixels reduces the chance of a photon impinging at these degraded-performance locations, without decreasing the overall probability of a photon passing through the collimator. As discussed herein, in various embodiments parallel-hole and/or pin-hole collimation may be employed.

A controller unit 1030 may control the movement and positioning of the patient table 1020, imaging detectors 1002 (which may be configured as one or more arms), gantry 1004 and/or the collimators 1022 (that move with the imaging detectors 1002 in various embodiments, being coupled thereto). A range of motion before or during an acquisition, or between different image acquisitions, is set to maintain the actual FOV of each of the imaging detectors 1002 directed, for example, towards or "aimed at" a particular area or region of the subject 1010 or along the entire subject 1010. The motion may be a combined or complex motion in multiple directions simultaneously, concurrently, or sequentially as described in more detail herein.

The controller unit 1030 may have a gantry motor controller 1032, table controller 1034, detector controller 1036, pivot controller 1038, and collimator controller 1040. The controllers 1030, 1032, 1034, 1036, 1038, 1040 may be automatically commanded by a processing unit 1050, manually controlled by an operator, or a combination thereof. The gantry motor controller 1032 may move the imaging detectors 1002 with respect to the subject 1010, for example, individually, in segments or subsets, or simultaneously in a fixed relationship to one another. For example, in some embodiments, the gantry controller 1032 may cause the imaging detectors 1002 and/or support members 1012 to move relative to or rotate about the subject 1010, which may include motion of less than or up to 180 degrees (or more).

The table controller 1034 may move the patient table 1020 to position the subject 1010 relative to the imaging detectors 1002. The patient table 1020 may be moved in up-down directions, in-out directions, and right-left directions, for example. The detector controller 1036 may control movement of each of the imaging detectors 1002 to move together as a group or individually as described in more detail herein. The detector controller 1036 also may control movement of the imaging detectors 1002 in some embodiments to move closer to and farther from a surface of the subject 1010, such as by controlling translating movement of the detector carriers 1016 linearly towards or away from the subject 1010 (e.g., sliding or telescoping movement). Optionally, the detector controller 1036 may control movement of the detector carriers 1016 to allow movement of the detector array 1006 or 1008. For example, the detector controller 1036 may control lateral movement of the detector carriers 1016 illustrated by the T arrow (and shown as left and right as viewed in FIG. 10). In various embodiments, the detector controller 1036 may control the detector carriers 1016 or the support members 1012 to move in different lateral directions. Detector controller 1036 may control the swiveling motion of detectors 1002 together with their collimators 1022.

The pivot controller 1038 may control pivoting or rotating movement of the detector units 1014 at ends of the detector carriers 1016 and/or pivoting or rotating movement of the detector carrier 1016. For example, one or more of the detector units 1014 or detector carriers 1016 may be rotated about at least one axis to view the subject 1010 from a plurality of angular orientations to acquire, for example, 3D image data in a 3D SPECT or 3D imaging mode of operation. The collimator controller 1040 may adjust a position of an adjustable collimator, such as a collimator with adjustable strips (or vanes) or adjustable pinhole(s).

It should be noted that motion of one or more imaging detectors 1002 may be in directions other than strictly axially or radially, and motions in several motion directions may be used in various embodiment. Therefore, the term "motion controller" may be used to indicate a collective name for all motion controllers. It should be noted that the various controllers may be combined, for example, the detector controller 1036 and pivot controller 1038 may be combined to provide the different movements described herein.

Prior to acquiring an image of the subject 1010 or a portion of the subject 1010, the imaging detectors 1002, gantry 1004, patient table 1020 and/or collimators 1022 may be adjusted, such as to first or initial imaging positions, as well as subsequent imaging positions. The imaging detectors 1002 may each be positioned to image a portion of the subject 1010. Alternatively, for example in a case of a small size subject 1010, one or more of the imaging detectors 1002 may not be used to acquire data, such as the imaging detectors 1002 at ends of the detector arrays 1006 and 1008, which as illustrated in FIG. 10 are in a retracted position away from the subject 1010. Positioning may be accomplished manually by the operator and/or automatically, which may include using, for example, image information such as other images acquired before the current acquisition, such as by another imaging modality such as X-ray Computed Tomography (CT), MRI, X-Ray, PET or ultrasound. In some embodiments, the additional information for positioning, such as the other images, may be acquired by the same system, such as in a hybrid system (e.g., a SPECT/CT system). Additionally, the detector units 1014 may be configured to acquire non-NM data, such as x-ray CT data. In some embodiments, a multi-modality imaging system may be provided, for example, to allow performing NM or SPECT imaging, as well as x-ray CT imaging, which may include a dual-modality or gantry design as described in more detail herein.

After the imaging detectors 1002, gantry 1004, patient table 1020, and/or collimators 1022 are positioned, one or more images, such as three-dimensional (3D) SPECT images are acquired using one or more of the imaging detectors 1002, which may include using a combined motion that reduces or minimizes spacing between detector units 1014. The image data acquired by each imaging detector 1002 may be combined and reconstructed into a composite image or 3D images in various embodiments.

In one embodiment, at least one of detector arrays 1006 and/or 1008, gantry 1004, patient table 1020, and/or collimators 1022 are moved after being initially positioned, which includes individual movement of one or more of the detector units 1014 (e.g., combined lateral and pivoting movement) together with the swiveling motion of detectors 1002. For example, at least one of detector arrays 1006 and/or 1008 may be moved laterally while pivoted. Thus, in various embodiments, a plurality of small sized detectors, such as the detector units 1014 may be used for 3D imaging, such as when moving or sweeping the detector units 1014 in combination with other movements.

In various embodiments, a data acquisition system (DAS) 1060 receives electrical signal data produced by the imaging detectors 1002 and converts this data into digital signals for subsequent processing. However, in various embodiments, digital signals are generated by the imaging detectors 1002. An image reconstruction device 1062 (which may be a processing device or computer) and a data storage device 1064 may be provided in addition to the processing unit 1050. It should be noted that one or more functions related to one or more of data acquisition, motion control, data processing and image reconstruction may be accomplished through hardware, software and/or by shared processing resources, which may be located within or near the imaging system 1000, or may be located remotely. Additionally, a user input device 1066 may be provided to receive user inputs (e.g., control commands), as well as a display 1068 for displaying images. DAS 1060 receives the acquired images from detectors 1002 together with the corresponding lateral, vertical, rotational and swiveling coordinates of gantry 1004, support members 1012, detector units 1014, detector carriers 1016, and detectors 1002 for accurate reconstruction of an image including 3D images and their slices.

Figure 11:
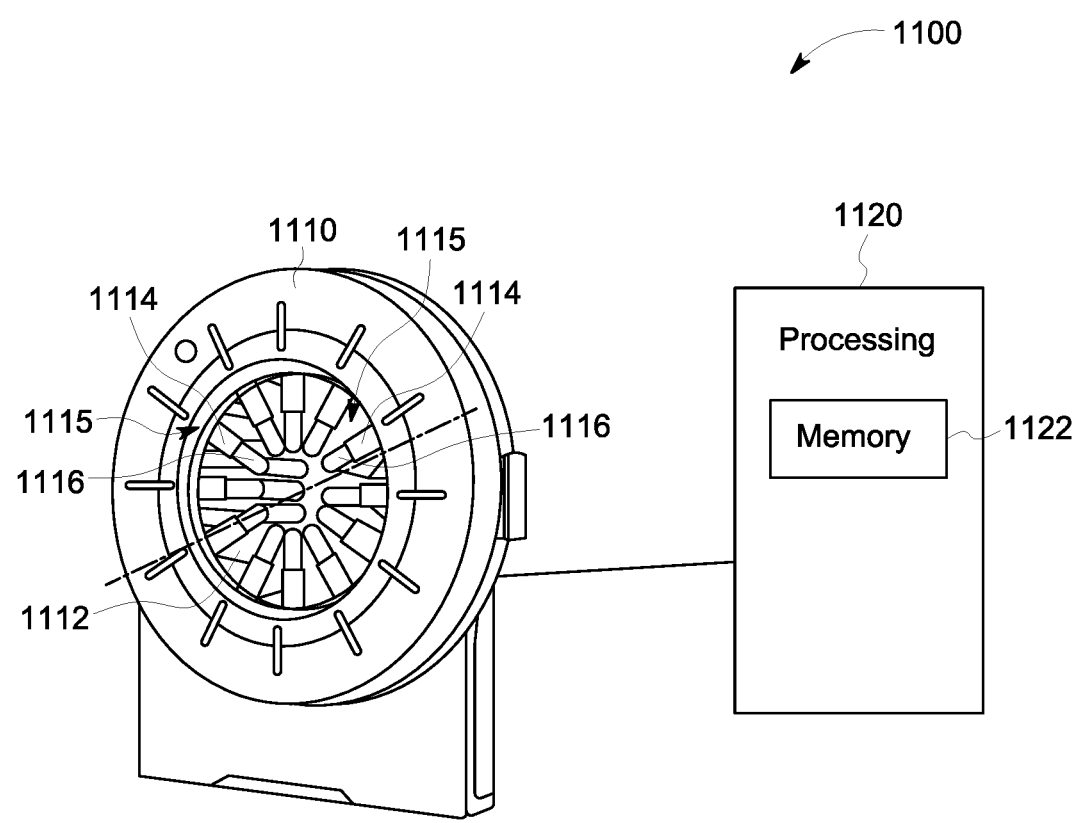
FIG. 11 is a schematic block diagram of a Nuclear Medicine (NM) imaging system in accordance with various embodiments.

It may be noted that the embodiment of FIG. 10 may be understood as a linear arrangement of detector heads (e.g., utilizing detector units arranged in a row and extending parallel to one another. In other embodiments, a radial design may be employed. Radial designs, for example, may provide additional advantages in terms of efficiently imaging smaller objects, such as limbs, heads, or infants. FIG. 11 provides a schematic view of a nuclear medicine (NM) multi-head imaging system 1100 in accordance with various embodiments. Generally, the imaging system 1100 is configured to acquire imaging information (e.g., photon counts) from an object to be imaged (e.g., a human patient) that has been administered a radiopharmaceutical. The depicted imaging system 1100 includes a gantry 1110 having a bore 1112 therethrough, plural radiation detector head assemblies 1115, and a processing unit 1120.

The gantry 1110 defines the bore 1112. The bore 1112 is configured to accept an object to be imaged (e.g., a human patient or portion thereof). As seen in FIG. 11, plural radiation detector head assemblies 1115 are mounted to the gantry 1110. In the illustrated embodiment, each radiation detector head assembly 1115 includes an arm 1114 and a head 1116. The arm 1114 is configured to articulate the head 1116 radially toward and/or away from a center of the bore 1112 (and/or in other directions), and the head 1116 includes at least one detector, with the head 1116 disposed at a radially inward end of the arm 1114 and configured to pivot to provide a range of positions from which imaging information is acquired.

The detector of the head 1116, for example, may be a semiconductor detector. For example, a semiconductor detector various embodiments may be constructed using different materials, such as semiconductor materials, including Cadmium Zinc Telluride (CdZnTe), often referred to as CZT, Cadmium Telluride (CdTe), and Silicon (Si), among others. The detector may be configured for use with, for example, nuclear medicine (NM) imaging systems, positron emission tomography (PET) imaging systems, and/or single photon emission computed tomography (SPECT) imaging systems.

In various embodiments, the detector may include an array of pixelated anodes, and may generate different signals depending on the location of where a photon is absorbed in the volume of the detector under a surface if the detector. The volumes of the detector under the pixelated anodes are defined as voxels (not shown in FIG. 1). For each pixelated anode, the detector has a corresponding voxel. The absorption of photons by certain voxels corresponding to particular pixelated anodes results in charges generated that may be counted. The counts may be correlated to particular locations and used to reconstruct an image.

In various embodiments, each detector head assembly 1115 may define a corresponding view that is oriented toward the center of the bore 1112. Each detector head assembly 1115 in the illustrated embodiment is configured to acquire imaging information over a sweep range corresponding to the view of the given detector unit. Additional details regarding examples of systems with detector units disposed radially around a bore may be found in U.S. patent application Ser. No. 14/788,180, filed 30 Jun. 2015, entitled "Systems and Methods For Dynamic Scanning With Multi-Head Camera," the subject matter of which is incorporated by reference in its entirety.

The processing unit 1120 includes memory 1122. The imaging system 1100 is shown as including a single processing unit 1120; however, the block for the processing unit 1120 may be understood as representing one or more processors that may be distributed or remote from each other. The depicted processing unit 1120 includes processing circuitry configured to perform one or more tasks, functions, or steps discussed herein. It may be noted that "processing unit" as used herein is not intended to necessarily be limited to a single processor or computer. For example, the processing unit 1120 may include multiple processors and/or computers, which may be integrated in a common housing or unit, or which may distributed among various units or housings.

Generally, various aspects (e.g., programmed modules) of the processing unit 1120 act individually or cooperatively with other aspects to perform one or more aspects of the methods, steps, or processes discussed herein. In the depicted embodiment, the memory 1122 includes a tangible, non-transitory computer readable medium having stored thereon instructions for performing one or more aspects of the methods, steps, or processes discussed herein.

Figure 12:
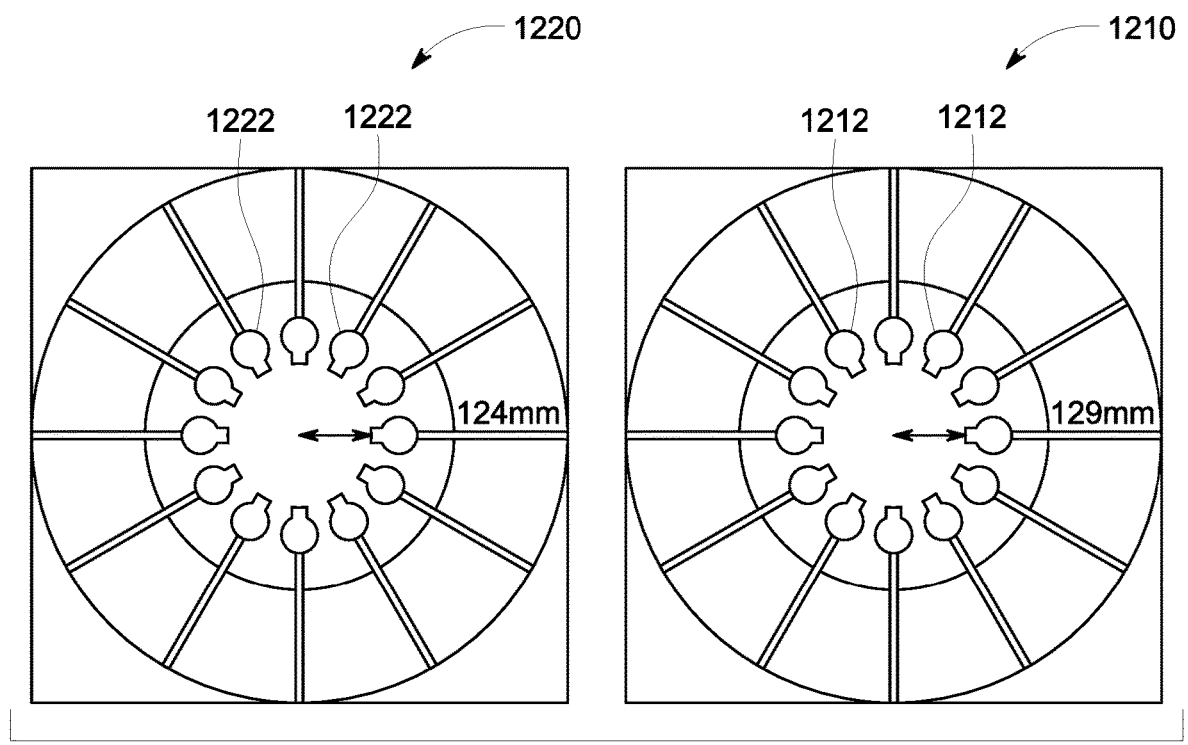
FIG. 12 illustrates detector head sizes for various arrangements.

By, for example, utilizing shorter septa heights, various embodiments provide for more compact detector head sizes. Use of smaller detector head sizes can provide improved imaging (e.g., decreased tail, improved resolution, and/or improved sensitivity) while also allowing for closer placement to smaller objects to be imaged. For example, FIG. 12 shows a first system 1210 having detector units 1212 that have a septa height of 18 millimeters and a detector unit diameter of 77 millimeters. As seen in FIG. 12, the detector units 1212 of first system 1210 may be extended to an inward position defining a radius of 129 millimeters. Second system 1220 has detector units 1222 that have a septa height of 15 millimeters and a detector unit diameter of 74 millimeters. As seen in FIG. 12, the detector units 1222 of second system 1220 may be extended to an inward position defining a radius of 124 millimeters, allowing for closer placement to smaller objects than is possible for first system 1210.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A nuclear medicine imaging system comprising:
   a gantry including a bore; and
   a plurality of detector head assemblies mounted to the gantry, wherein the gantry is configured to rotate around a center of the bore, wherein each of the plurality of detector head assemblies comprises:
      a head attached to an arm, wherein the arm is configured to articulate the head both radially toward the center of the bore and radially away from the center of the bore, wherein the head comprises at least one detector unit disposed at a radially inward end of the arm, and wherein the head is configured to pivot with respect to the arm;
      wherein the at least one detector unit comprises:
         a semiconductor detector including a first surface and a second surface opposed to the first surface, wherein the first surface comprises pixelated anodes and the second surface comprises a cathode electrode; and
         a parallel-hole collimator including openings defined by septa, the collimator defining a pitch D between adjacent septa, the septa defining a septa length L, wherein a ratio of L/D is less than 14;

wherein each of the plurality of detector head assemblies may be extended to an inward position at the same time to collectively define a radius of 129 millimeters or less from the center of the bore.

2. The nuclear medicine imaging system of claim 1, wherein each of the plurality of detector head assemblies may be extended to the inward position at the same time to collectively define a radius of less than 129 millimeters from the center of the bore.

3. The nuclear medicine imaging system of claim 1, wherein each of the plurality of detector head assemblies may be extended to the inward position at the same time to collectively define a radius of 129 millimeters from the center of the bore.

4. The nuclear medicine imaging system of claim 1, wherein each of the plurality of detector head assemblies may be extended to the inward position at the same time to collectively define a radius of 124 millimeters or less from the center of the bore.

5. The nuclear medicine imaging system of claim 1, wherein each of the plurality of detector head assemblies may be extended to the inward position at the same time to collectively define a radius of 124 millimeters from the center of the bore.

6. The nuclear medicine imaging system of claim 1, wherein the plurality of detector head assemblies comprises at least five detector head assemblies.

7. The nuclear medicine imaging system of claim 1, wherein the plurality of detector head assemblies comprises twelve detector head assemblies.

8. A nuclear medicine imaging system comprising:
a gantry including a bore; and
a plurality of detector head assemblies mounted to the gantry, wherein the gantry is configured to rotate around a center of the bore, wherein each of the plurality of detector head assemblies comprises:
a head attached to an arm, wherein the arm is configured to articulate the head both radially toward the center of the bore and radially away from the center of the bore, wherein the head comprises at least one detector unit disposed at a radially inward end of the arm, and wherein the head is configured to pivot with respect to the arm;
wherein the at least one detector unit comprises:
a semiconductor detector including a first surface and a second surface opposed to the first surface, wherein the first surface comprises pixelated anodes and the second surface comprises a cathode electrode; and
a parallel-hole collimator including openings defined by septa;
wherein the detector unit has an outer diameter of 77 millimeters or less;
wherein each of the plurality of detector head assemblies may be extended to an inward position at the same time to collectively define a radius of 129 millimeters or less from the center of the bore.

9. The nuclear medicine imaging system of claim 8, wherein the plurality of detector head assemblies comprises at least five detector head assemblies.

10. The nuclear medicine imaging system of claim 9, wherein the detector unit has an outer diameter of 77 millimeters.

11. The nuclear medicine imaging system of claim 9, wherein the detector unit has an outer diameter of 74 millimeters or less.

12. A nuclear medicine imaging system comprising:
a gantry including a bore; and
a plurality of detector head assemblies mounted to the gantry, wherein the gantry is configured to rotate around a center of the bore, wherein each of the plurality of detector head assemblies comprises:
a head attached to an arm, wherein the arm is configured to articulate the head both radially toward the center of the bore and radially away from the center of the bore, wherein the head comprises at least one detector unit disposed at a radially inward end of the arm, and wherein the head is configured to pivot with respect to the arm;
wherein the at least one detector unit comprises:
a semiconductor detector including a first surface and a second surface opposed to the first surface, wherein the first surface comprises pixelated anodes and the second surface comprises a cathode electrode; and
a parallel-hole collimator including openings defined by septa having a septa height of 18 millimeters or less;
wherein each of the plurality of detector head assemblies may be extended to an inward position at the same time to collectively define a radius of 129 millimeters or less from the center of the bore.

13. The nuclear medicine imaging system of claim 12, wherein the septa height is 18 millimeters.

14. The nuclear medicine imaging system of claim 12, wherein the septa height is 15 millimeters or less.

15. The nuclear medicine imaging system of claim 14, wherein the septa height is 15 millimeters.

16. The nuclear medicine imaging system of claim 14, wherein the detector unit has an outer diameter of 77 millimeters or less.

17. The nuclear medicine imaging system of claim 14, wherein the detector unit has an outer diameter of 74 millimeters or less.

18. The nuclear medicine imaging system of claim 12, wherein the detector unit has an outer diameter of 77 millimeters or less.

19. The nuclear medicine imaging system of claim 12, wherein the detector unit has an outer diameter of 74 millimeters or less.

20. The nuclear medicine imaging system of claim 12, wherein the plurality of detector head assemblies comprises at least five detector head assemblies.

* * * * *